United States Patent
Liu

(10) Patent No.: US 9,299,017 B2
(45) Date of Patent: Mar. 29, 2016

(54) CONSUMABLE MANAGEMENT METHOD AND EQUIPMENT THEREOF

(71) Applicant: HITI DIGITAL, INC., New Taipei (TW)

(72) Inventor: Cheng-Wei Liu, New Taipei (TW)

(73) Assignee: Hiti Digital, Inc., New Taipei (TW)

( * ) Notice: Subject to any disclaimer, the term of this patent is extended or adjusted under 35 U.S.C. 154(b) by 0 days.

(21) Appl. No.: 14/495,834

(22) Filed: Sep. 24, 2014

(65) Prior Publication Data

US 2015/0261485 A1    Sep. 17, 2015

Related U.S. Application Data

(60) Provisional application No. 61/953,941, filed on Mar. 17, 2014.

(30) Foreign Application Priority Data

Jul. 29, 2014  (TW) .............................. 103125880 A

(51) Int. Cl.
*G06K 1/00* (2006.01)
*G06K 15/00* (2006.01)
*B41J 2/175* (2006.01)

(52) U.S. Cl.
CPC ........... *G06K 15/407* (2013.01); *B41J 2/17543* (2013.01)

(58) Field of Classification Search
USPC ......................................................... 358/1.14
See application file for complete search history.

(56) References Cited

U.S. PATENT DOCUMENTS

| | | | |
|---|---|---|---|
| 2009/0045926 A1* | 2/2009 | Ebrom et al. | 340/310.11 |
| 2010/0163133 A1* | 7/2010 | Barnes et al. | 140/1 |
| 2010/0289845 A1* | 11/2010 | Conway et al. | 347/16 |
| 2013/0063770 A1* | 3/2013 | Lee et al. | 358/1.15 |
| 2013/0155459 A1* | 6/2013 | Jeong et al. | 358/1.15 |
| 2013/0321853 A1* | 12/2013 | Lee et al. | 358/1.14 |
| 2014/0164725 A1* | 6/2014 | Jang et al. | 711/163 |
| 2014/0164753 A1* | 6/2014 | Lee | 713/2 |
| 2015/0110504 A1* | 4/2015 | Lee et al. | 399/12 |

\* cited by examiner

*Primary Examiner* — Ngon Nguyen
(74) *Attorney, Agent, or Firm* — Blakely, Sokoloff, Taylor & Zafman LLP

(57) ABSTRACT

A consumable management method includes the following steps. A general consumable and an enabling key storage device are provided to a dealer. The general consumable includes an enabling chip. The enabling key storage device stores an exclusive enabling key. The dealer is instructed to use a burning tool to burn the exclusive enabling key into the enabling chip of the general consumable, so as to make the general consumable become an exclusive consumable, which is exclusively available to at least one first printing device that is only authenticated by the exclusive enabling key.

5 Claims, 5 Drawing Sheets

CONSUMABLE MANAGEMENT METHOD AND EQUIPMENT THEREOF

RELATED APPLICATIONS

This application claims priority to U.S. Provisional Application Ser. No. 61/953,941, filed Mar. 17, 2014, and claims priority to Taiwan Application Ser. No. 103125880, filed Jul. 29, 2014, the entirety of which is herein incorporated by reference.

BACKGROUND

1. Technical Field

Embodiments of the present invention relate to a consumable management method. More particularly, embodiments of the present invention relate to a consumable management method and apparatus.

2. Description of Related Art

A consumable for a typical printer, such as a ribbon, includes a chip burned with an exclusive enabling key. When the consumable is installed in the printer, the printer accesses the exclusive key. If the exclusive enabling key matches the predefined enabling key stored in the printer, the printer can work. Contrarily, if the exclusive enabling key does not match the predefined enabling key stored in the printer, the printer cannot work.

Typically, the manufacturer can only provide consumables burned with different exclusive keys to different dealers. As such, the manufacturer can only provide a consumable burned with the first key to the first dealer, and cannot provide a consumable burned with the second key to the first dealer, which creates inconvenience for the manufacturer to have to manage the consumables in stock.

SUMMARY

Embodiments of the present invention allow for easier management of consumables without being limited by the situation in which a particular consumable is only available to a particular dealer.

In accordance with one embodiment of the present invention, a consumable management method includes the following steps. A general consumable and an enabling key storage device are provided to a dealer. The general consumable includes an enabling chip. The enabling key storage device stores an exclusive enabling key. The dealer is instructed to use a burning tool to burn the exclusive enabling key into the enabling chip of the general consumable, so as to make the general consumable become an exclusive consumable, which is exclusively available to at least one first printing device that is only authenticated by the exclusive enabling key.

In accordance with another embodiment of the present invention, a consumable management method includes the following steps. A general consumable and an enabling key storage device are received from a consumable provider. The general consumable includes an enabling chip. The enabling key storage device stores an exclusive enabling key. A burning tool is used to burn the exclusive enabling key into the enabling chip of the general consumable, so as to make the general consumable become an exclusive consumable, which is exclusively available to at least one first printing device that is only authenticated by the exclusive enabling key.

In accordance with yet another embodiment of the present invention, a consumable management apparatus includes an enabling key storage device and a burning tool. The enabling key storage device is provided from a consumable provider to a dealer. The enabling key storage device stores an exclusive enabling key. The burning tool is used by the dealer to burn the exclusive enabling key into an enabling chip of a general consumable, so as to make the general consumable become an exclusive consumable, which is exclusively available to at least one first printing device that is only authenticated by the exclusive enabling key.

In the foregoing embodiments, the dealer burns the general consumable to become the exclusive consumable, and the consumable provider only needs to provide the general consumables to the dealers, in which the general consumables are available to all dealers of the consumable provider. In other words, the general consumable is not burned with the exclusive enabling key. As a result, even though some first general consumables for the first dealer remain in stock, the first general consumables can be provided to the second dealer as well. Therefore, the consumable provider can easily manage the consumables in stock.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
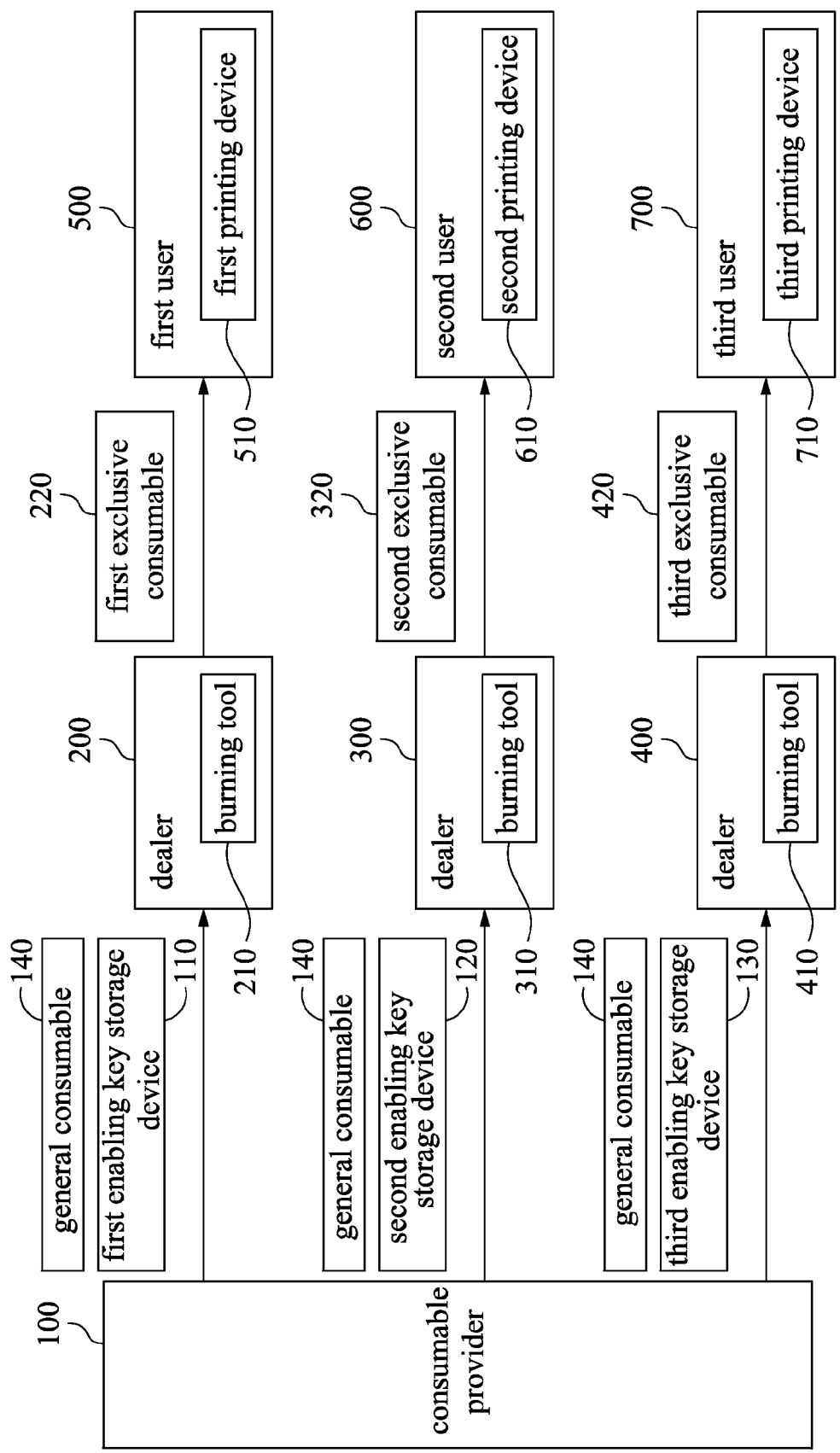
FIG. 1 is a block diagram of the business model implementing the consumable management method in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of the business model implementing the consumable management method in accordance with one embodiment of the present invention. As shown in FIG. 1, the dealers 200, 300 and 400 can respectively utilize the burning tools 210, 310 and 410 to make the exclusive consumables. In particular, at first, the consumable provider 100 produces the general consumables 140, and provides the general consumables 140 to the dealers 200, 300 and 400. Then, the consumable provider 100 instructs the dealer 200 to utilize the burning tool 210 to burn an exclusive enabling key into the general consumable 140, so as to make the general consumable 140 become the first exclusive consumable 220; similarly, the consumable provider 100 instructs the dealer 300 to utilize the burning tool 310 to burn an exclusive enabling key into the general consumable 140, so as to make the general consumable 140 become the second exclusive consumable 320; similarly, the consumable provider 100 instructs the dealer 400 to utilize the burning tool 410 to burn an exclusive enabling key into the general consumable 140, so as to make the general consumable 140 become the third exclusive consumable 420, The first exclusive consumable 220, the second exclusive consumable 320 and the third exclusive consumable 420 are respectively burned with different exclusive enabling keys. The first exclusive consumable 220 is exclusively available to at least one first printing device 510 that only authenticates the exclusive enabling key burned in the first exclusive consumable 220. The second exclusive consumable 320 is exclusively available to at least one second printing device 610 that only authenticates the exclusive enabling key burned in the second exclusive consumable 320. The third exclusive consumable 420 is exclusively available to at least one third printing device 710 that only authenticates the exclusive enabling key burned in the third exclusive consumable 420.

In this embodiment, the consumable provider 100 provides the general consumables 140, available to all of the dealers 200, 300 and 400, to the dealers 200, 300 and 400. As such, even though the general consumables 140 for the dealer 200 remain in stock, these general consumables 140 can be provided to the dealer 300 or 400 as well. Therefore, the consumable provider 100 can easily manage the general consumables 140 in stock, and is not limited by the situation that a particular consumable is only available to a particular dealer.

Moreover, the first printing device 510 can only authenticate the exclusive enabling key burned in the first exclusive consumable 220, the second printing device 610 can only authenticate the exclusive enabling key burned in the second exclusive consumable 320, and the third printing device 710 can only authenticate the exclusive enabling key burned in the third exclusive consumable 420. Therefore, the first exclusive consumable 220 burned by the dealer 200 is only available to the first printing device 510 of the first user 500, and the second exclusive consumable 320 burned by the dealer 300 is only available to the second printing device 610 of the second user 600, and the third exclusive consumable 420 burned by the dealer 400 is only available to the third printing device 510 of the third user 700.

In other words, because the first exclusive consumable 220, the second exclusive consumable 320 and the third exclusive consumable 420 are burned with exclusive enabling keys that are different from each other, the first user 500, the second user 600 and the third user 700 can only use the first exclusive consumable 220, the second exclusive consumable 320 and the third exclusive consumable 420 respectively, to enable the first printing device 510, the second printing device 610 and the third printing device 710 for performing printing process. As a result, the dealer 200 cannot provide the first exclusive consumable 220 to the second user 600 or the third user 700; similarly, he dealer 300 cannot provide the second exclusive consumable 320 to the first user 500 or the third user 700; similarly, the dealer 400 cannot provide the third exclusive consumable 420 to the first user 500 or the second user 600. Therefore, the method described above can prevent the dealers 200, 300 and 400 from destructive competition.

Figure 2:
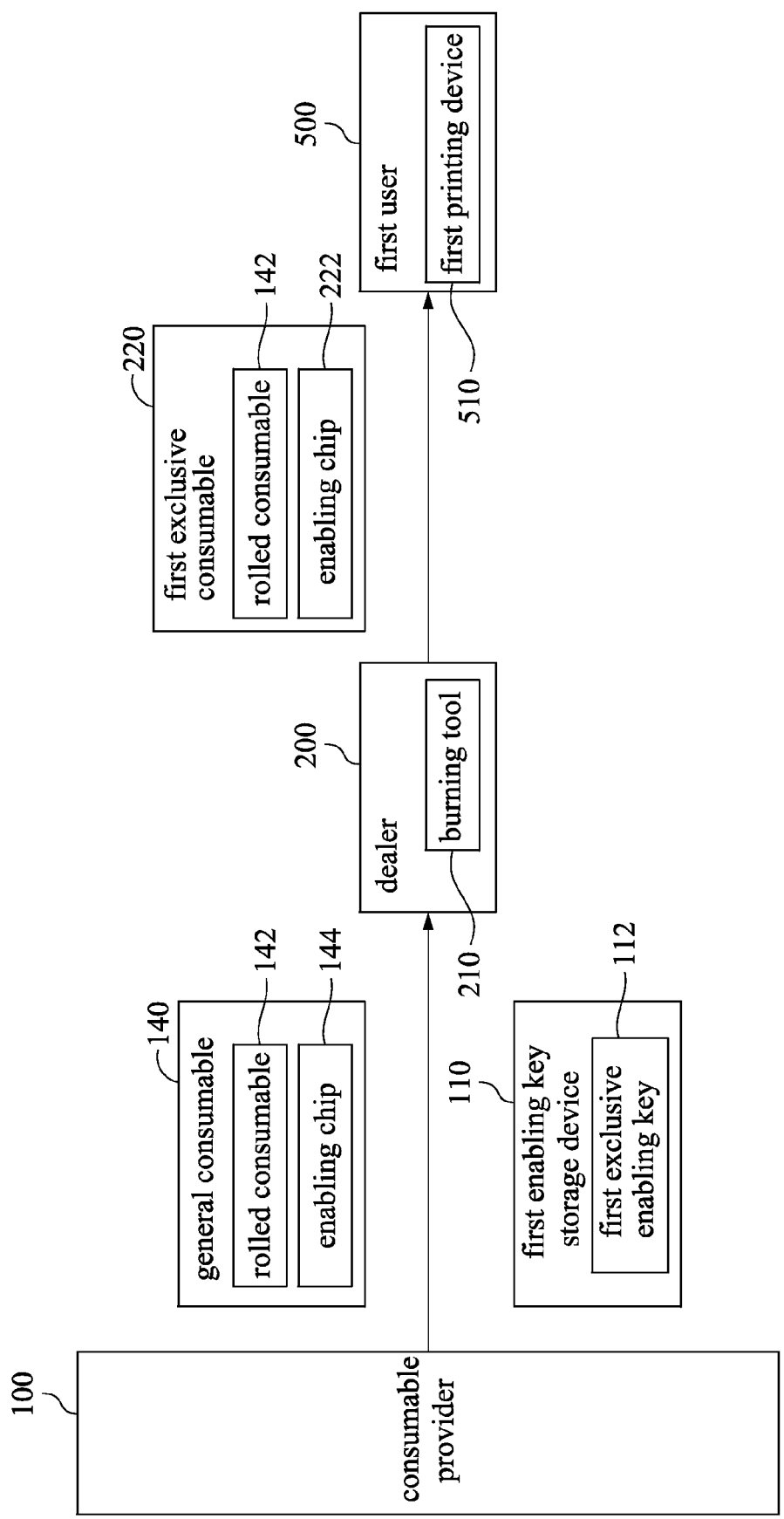
FIG. 2 is a block diagram of the business model implementing the consumable management method among the consumable provider, the dealer and the first user in accordance with one embodiment of the present invention.

FIG. 2 is a block diagram of the business model implementing the consumable management method among the consumable provider 100, the dealer 200 and the first user 500 in accordance with one embodiment of the present invention. As shown in FIG. 2, the consumable provider 100 not only provides the general consumable 140 to the dealer 200, but also provides the first enabling key storage device 110 to the dealer 200. In other words, the dealer 200 can receive the first enabling key storage device 110 and the general consumable 140 from the consumable provider 100. The first enabling key storage device 110 stores a first exclusive enabling key 112. The general consumable 140 includes a rolled consumable 142 and an enabling chip 144. The consumable provider 100 can instruct the dealer 200 to utilize the burning tool 210 to burn the first exclusive enabling key 112 into the enabling chip 144 of the general consumable 140, so as to make the enabling chip 144 become the enabling chip 222 burned with the first exclusive enabling key 122, so that the general consumable 140 become the first exclusive consumable 220. The dealer 200 provides the first exclusive consumable 220 to the first user 500. The first printing device 510 of the first user 500 accesses the first exclusive enabling key 112 burned in the enabling chip 222, and checks whether the first exclusive enabling key 112 matches the predefined key stored in the first printing device 510. When the first exclusive enabling key 112 matches the predefined key stored in the first printing device 510, the first printing device 510 authenticates the first exclusive enabling key 112, so that the first printing device 510 can use the first exclusive consumable 220. For example, the first printing device 510 can use the rolled consumable 142 of the first exclusive consumable 220 to print. In some embodiments, the rolled consumable 142 may include, but is not limited to include, a ribbon.

Figure 3:
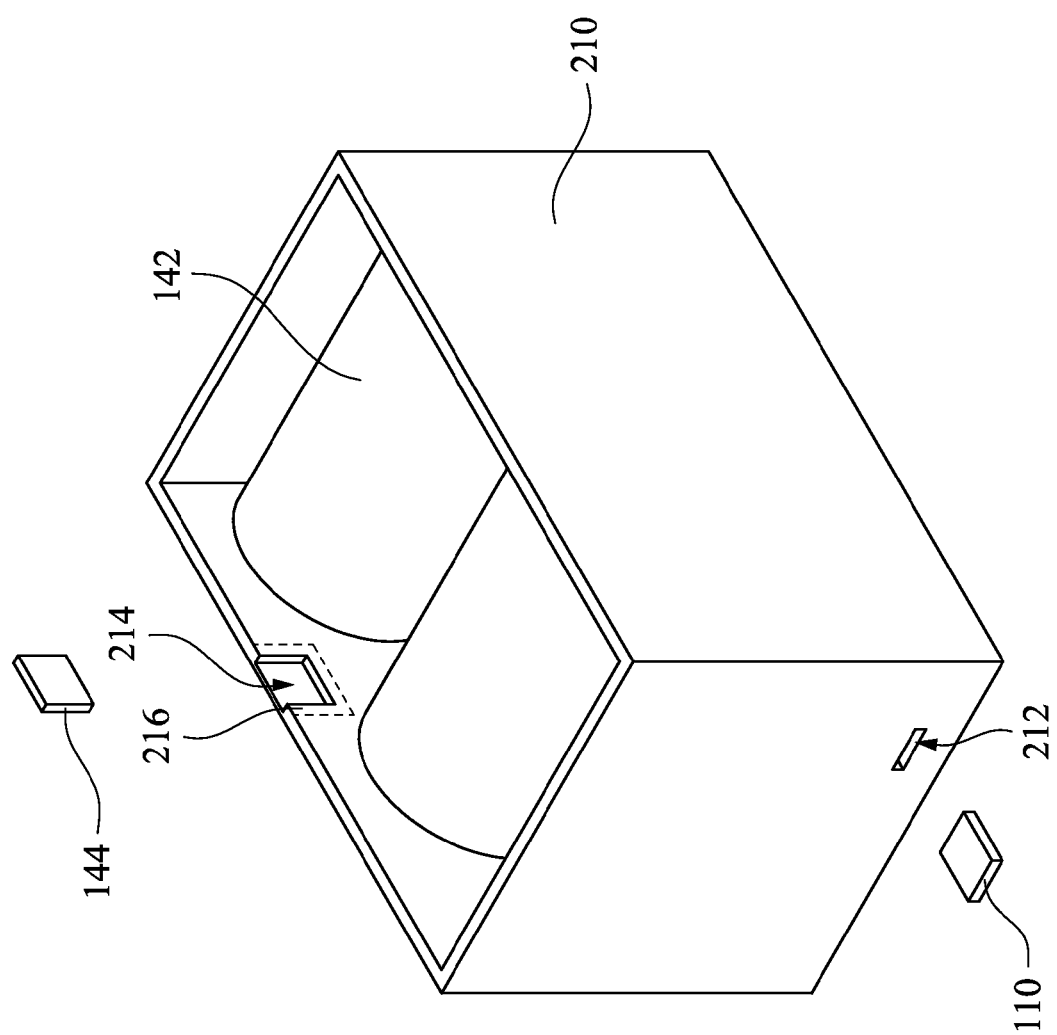
FIG. 3 is a perspective view of the burning tool in accordance with one embodiment of the present invention.

In some embodiments, the consumable provider 100 can instruct the dealer 200 to install the first enabling key storage device 110 into the burning tool 210 for making the burning tool 210 access the exclusive enabling key 112, which facilitates the burning tool 210 to access the first exclusive enabling key 112, so that the burning tool 210 can burn the first exclusive enabling key 112 into the enabling chip 144 of the general consumable 140. For example, referring to FIG. 3, which is a perspective view of the burning tool 210 in accordance with one embodiment of the present invention. As shown in FIG. 3, the burning tool 210 includes a storage connection port 212, an enabling chip socket 214 and a burning circuit 216. The storage connection port 212 can be inserted by the first enabling key storage device 110, so that the first enabling key storage device 110 can be installed, and the storage connection port 212 can electrically connect the first enabling key storage device 110 for accessing the first exclusive enabling key 112 (See FIG. 2) stored in the first enabling key storage device 110. The enabling chip socket 214 can be inserted by the enabling chip 144. The burning circuit 216 is electrically connected to the storage connection port 212, so as to burn the first exclusive enabling key 112 into the enabling chip 144 in the enabling chip socket 214, As such, the enabling chip 144 can be burned with the first exclusive enabling key 112 to become the enabling chip 222 (See FIG. 2), so that the general consumable 140 can become the first exclusive consumable 220 (See FIG. 2). In some embodiments, the first enabling key storage device 110 can include a storage medium storing the first exclusive enabling key 112, such as, for example, a SAM card, an USB flash drive, or an RFID card.

In some embodiments, as shown in FIGS. 1 and 2, the general consumable 140 is formed by setting a general enabling key into the enabling chip 144. The general enabling key is overwritable to the burning tool 210 of the dealer 200, the burning tool 310 of the dealer 300 and the burning tool 410 of the dealer 400. In particular, the consumable provider 100 can set the general enabling key to the enabling chip 144 of all general consumable 140. The burning 210, 310 and 410 can overwrite the general enabling key set in the enabling chip 144. For example, the burning tool 210 is installed with the first enabling key storage device 110, and it can overwrite the general enabling key to be the first exclusive enabling key 112 stored in the first enabling key storage device 110 in a burn recording manner. Similarly, the burning tools 310 and 410 can be installed with enabling key storage devices, so as to overwrite the general enabling key to be other different exclusive enabling keys. As a result, the general consumable 140 is available to the burning tools 210, 310 and 410. In other words, the burning tools 210, 310 and 410 can perform burning recording process to the general consumable to form different exclusive consumables, so that the general consumable 140 can be provided to any one of the dealers 200, 300 and 400, thereby facilitating the consumable provider 100 to manage the consumables in stock.

Figure 4:
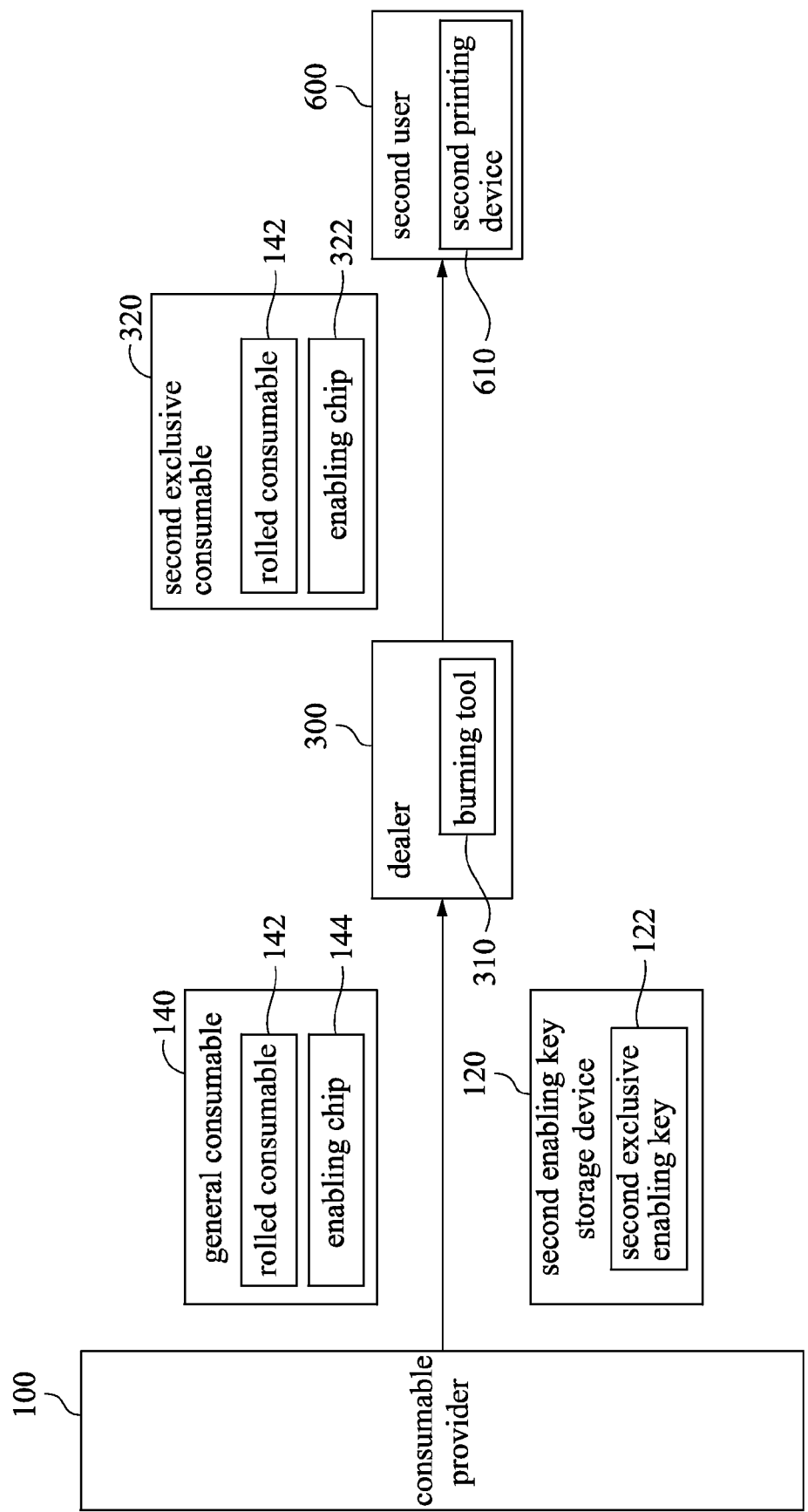
FIG. 4 is a block diagram of the business model implementing the consumable management method among the consumable provider, the dealer and the second user in accordance with one embodiment of the present invention.

FIG. 4 is a block diagram of the business model implementing the consumable management method among the consumable provider 100, the dealer 300 and the second user 600 in accordance with one embodiment of the present invention. As shown in Hg. 4, the consumable provider 100 provides the second enabling key storage device 120 to the dealer 300. The second enabling key storage device 120 stores a second exclusive enabling key 122 that is different from the first exclusive enabling key 112 (See FIG. 2), so that the second exclusive enabling key 122 and the first exclusive enabling key 112 can be authenticated by different printing devices. The consumable provider 100 can instruct the dealer 300 to utilize the burning tool 310 to burn the second exclusive enabling key 122 into the enabling chip 144 of the general consumable 140, so as to make the enabling chip 144 become the enabling chip 322 burned with the second exclusive enabling key 122, so that the general consumable 140 become the first exclusive consumable 320. The dealer 300 provides the second exclusive consumable 320 to the second user 600. The second printing device 610 of the second user 600 accesses the second exclusive enabling key 122 burned in the enabling chip 322, and checks whether the second exclusive enabling key 122 matches the predefined key stored in the second printing device 610. When the second exclusive enabling key 122 matches the predefined key stored in the second printing device 610, the second printing device 610 authenticates the second exclusive enabling key 122, so that the second printing device 610 can use the second exclusive consumable 320. For example, the second printing device 610 can use the rolled consumable 142 of the second exclusive consumable 320 to print. In some embodiments, the second enabling key storage device 120 can include a storage medium storing the second exclusive enabling key 122, such as, for example, a SAM card, an USB flash drive, or an RFID card. In some embodiments, the relation among the burning tool 310, the general consumable 140 and the second enabling key storage device 120 is the same as which is shown in FIG. 3 and the foregoing paragraphs, and therefore, it is not described repeatedly.

Figure 5:
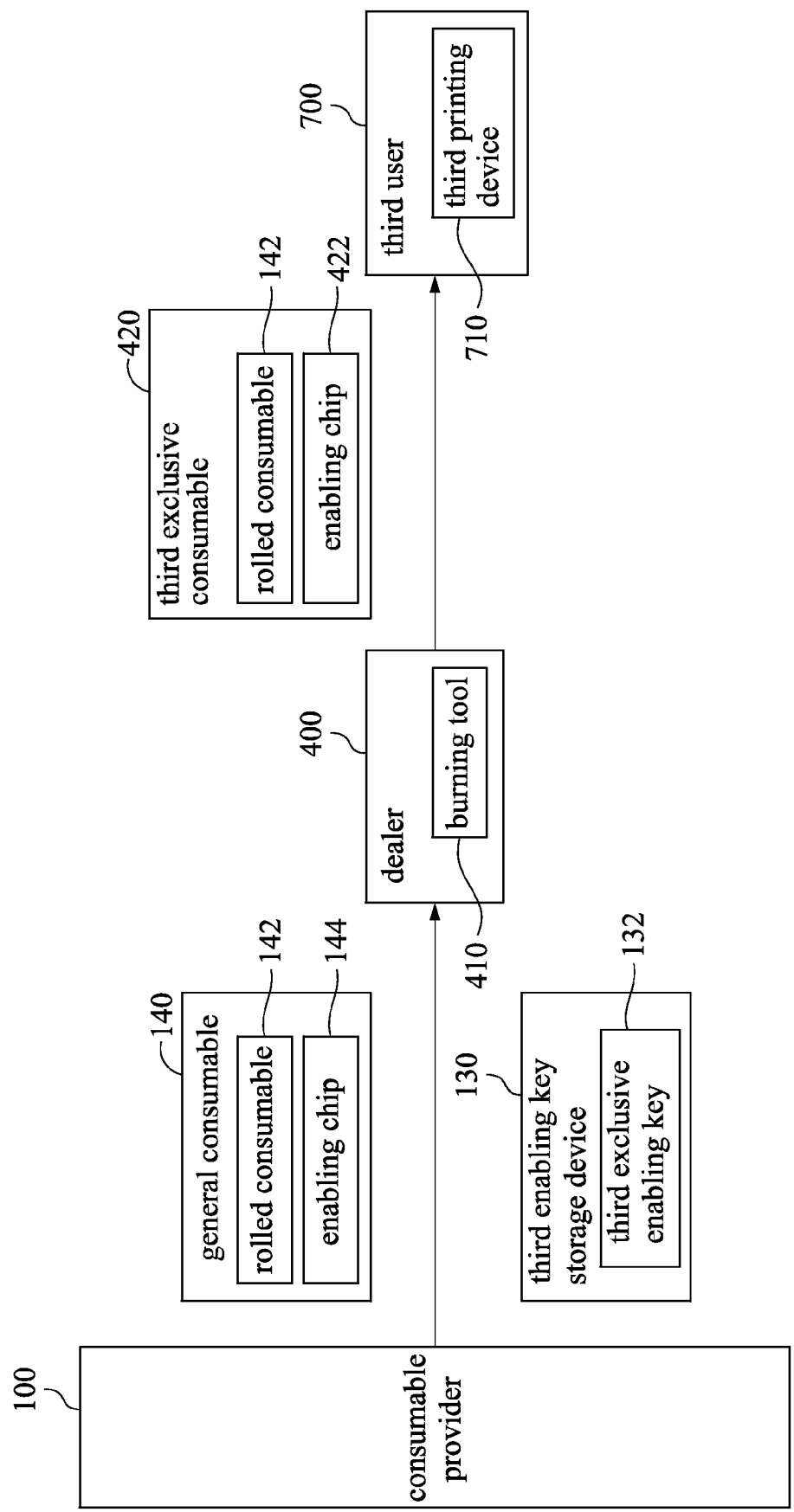
FIG. 5 is a block diagram of the business model implementing the consumable management method among the consumable provider, the dealer and the third user in accordance with one embodiment of the present invention.

FIG. 5 is a block diagram of the business model implementing the consumable management method among the consumable provider 100, the dealer 400 and the third user 700 in accordance with one embodiment of the present invention. As shown in FIG. 5, the consumable provider 100 provides the third enabling key storage device 130 to the dealer 400, The third enabling key storage device 130 stores a third exclusive enabling key 132 that is different from the first exclusive enabling key 112 (See FIG. 2) and the second exclusive enabling key 122 (See FIG. 4), so that the third exclusive enabling key 132, the second exclusive enabling key 122 and the first exclusive enabling key 112 can be authenticated by different printing devices. The consumable provider 100 can instruct the dealer 400 to utilize the burning tool 410 to burn the third exclusive enabling key 132 into the enabling chip 144 of the general consumable 140, so as to make the enabling chip 144 become the enabling chip 422 burned with the third exclusive enabling key 132, so that the general consumable 140 become the third exclusive consumable 420. The dealer 400 provides the third exclusive consumable 420 to the third user 700. The third printing device 710 of the third user 700 accesses the third exclusive enabling key 132 burned in the enabling chip 422, and checks whether the third exclusive enabling key 132 matches the predefined key stored in the third printing device 710. When the third exclusive enabling key 132 matches the predefined key stored in the third printing device 710, the third printing device 710 authenticates the third exclusive enabling key 132, so that the third printing device 710 can use the third exclusive consumable 420. For example, the third printing device 710 can use the rolled consumable 142 of the third exclusive consumable 420 to print. In some embodiments, the third enabling key storage device 130 can include a storage medium storing the third exclusive enabling key 132, such as, for example, a SAM card, an USB flash drive, or an RFID card. In some embodiments, the relation among the burning tool 410, the general consumable 140 and the third enabling key storage device 130 is the same as which is shown in FIG. 3 and the foregoing paragraphs, and therefore, it is not described repeatedly.

Because the first exclusive enabling key 112, the second exclusive enabling key 122 and the third exclusive enabling key 132 are different from each other, and predefined key stored in the third printing device 710 matches the third exclusive enabling key 132, the first exclusive enabling key 112 and the second exclusive enabling key 122 does not match the predefined key stored in the third printing device 710. Therefore, the third printing device 710 cannot authenticate the first exclusive enabling key 112 or the second exclusive enabling key 122, and can only authenticate the third exclusive enabling key 132, so that the third printing device 710 can only use the third exclusive consumable 420 to print. Similarly, the first printing device 510 can only authenticate the first exclusive enabling key 112, so that the first printing device 510 can only use the first exclusive consumable 220 to print. Similarly, the second printing device 610 can only authenticate the second exclusive enabling key 122, so that the second printing device 610 can only use the second exclusive consumable 320 to print.

As a result, the first user 500 can only use the first exclusive consumable 220 provided by the dealer 200; the second user 600 can only use the second exclusive consumable 320 provided by the dealer 300; and the third user 700 can only use the third exclusive consumable 420 provided by the dealer 400, which can prevent the dealers 200, 300 and 400 from destructive competition.

It is understood that, although three users and three dealers are described above, the number of the users and the dealers is only explanatory, not limiting the present invention. It is understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. It is understood that the term "instruct" in this context refers that the consumable provider can explicitly or implicitly inform the dealer to execute particular procedure, such as burning the general consumable to become the exclusive consumable. It is understood that, although in this context, one dealer corresponds to one user, one dealer can also provide the exclusive consumables to plural users. It is understood that the different reference numbers of the burning tools 210, 310 and 410 are only used to make the reader understand the invention, it does not mean the burning tools used by the dealers are necessarily different.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A consumable management method, comprising:
providing a general consumable and an enabling key storage device, wherein the general consumable comprises an enabling chip, and the enabling key storage device stores an exclusive enabling key;
installing the enabling key storage device into a burning tool;
accessing the exclusive enabling key stored in the enabling key storage device by the burning tool; and
writing the accessed exclusive enabling key into the enabling chip of the general consumable by the burning tool in a burn recording manner, so as to make the general consumable become an exclusive consumable, which is exclusively available to at least one first printing device that only authenticates the exclusive enabling key.

2. The consumable management method of claim 1, wherein the general consumable is formed by setting a general enabling key into the enabling chip, wherein the general enabling key is overwritable to a plurality of the burning tools, wherein the burning tools are respectively installed with a plurality of the enabling key storage devices, wherein the enabling key storage devices respectively store a plurality of the exclusive enabling keys that are different.

3. A consumable management apparatus, comprising:
an enabling key storage device configured to store an exclusive enabling key; and
a burning tool configured to access the exclusive enabling key from the enabling key storage device and to write the accessed exclusive enabling key into an enabling chip of a general consumable in a burn recording manner, so as to make the general consumable become an exclusive consumable, which is exclusively available to at least one first printing device that only authenticates the exclusive enabling key.

4. The consumable management apparatus of claim 3, wherein the burning tool comprises:
a storage connection port for electrically connecting the enabling key storage device, whereby accessing the exclusive enabling key.

5. The consumable management apparatus of claim 3, wherein the enabling key storage device comprises a SAM card, an USB flash drive, or an RFD card.

* * * * *